United States Patent
Sherif et al.

(10) Patent No.: US 12,147,992 B2
(45) Date of Patent: Nov. 19, 2024

(54) SYSTEM, METHOD, AND COMPUTER-ACCESSIBLE MEDIUM FOR DETERMINING THE VERACITY OF A BANK FRAUD CALL

(71) Applicant: Capital One Services, LLC, McLean, VA (US)

(72) Inventors: Timur Sherif, Washington, DC (US); Michael Mossoba, Arlington, VA (US); Cara Weikel, Silver Spring, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 291 days.

(21) Appl. No.: 17/161,223

(22) Filed: Jan. 28, 2021

(65) Prior Publication Data

US 2022/0237629 A1     Jul. 28, 2022

(51) Int. Cl.
*G06Q 30/018*     (2023.01)
*G06Q 30/02*      (2023.01)
*H04L 9/32*       (2006.01)
*H04L 67/55*      (2022.01)

(52) U.S. Cl.
CPC ..... *G06Q 30/0185* (2013.01); *G06Q 30/0281* (2013.01); *H04L 9/3228* (2013.01); *H04L 9/3231* (2013.01); *H04L 67/55* (2022.05)

(58) Field of Classification Search
CPC ............ G06Q 30/0185; G06Q 30/0281; H04L 9/3228; H04L 9/3231; H04L 67/55; H04L 9/0863; H04L 51/04; H04L 51/212; H04L 63/0428; H04L 9/0643; H04L 51/046; H04L 63/108; H04L 9/0819; H04L 9/0894; G06F 8/61; G06F 8/65

USPC ...... 705/1.1, 71; 726/7, 4, 28; 713/153, 156, 713/168, 170, 176; 455/411; 379/210, 379/201

See application file for complete search history.

(56) References Cited

U.S. PATENT DOCUMENTS

| | | | |
|---|---|---|---|
| 7,010,689 B1 * | 3/2006 | Matyas, Jr. ............... | H04L 9/08 713/168 |
| 7,606,560 B2 | 10/2009 | Abrou et al. | |
| 8,407,112 B2 | 3/2013 | Walter | |

(Continued)

FOREIGN PATENT DOCUMENTS

| | | | | |
|---|---|---|---|---|
| CA | 3061108 A1 * | 5/2020 | ............... | G06F 8/61 |
| KR | 101520617 B1 * | 5/2015 | ............... | H04L 9/14 |

(Continued)

OTHER PUBLICATIONS

Ali, "Deceptive phishing detection system" (Year: 2012).*

*Primary Examiner* — Sangeeta Bahl
(74) *Attorney, Agent, or Firm* — HUNTON ANDREWS KURTH LLP

(57) ABSTRACT

A system can include, for example, a secure data module(s) configured to store sensitive data regarding the user(s), a synthetic dataset generating module(s) configured to generate the synthetic dataset based on the sensitive data, and a control module configured to receive a request from an application for a dataset related to the user(s), provide the request to the synthetic dataset generating module(s), receive the synthetic dataset from the synthetic dataset generating module(s), and provide the synthetic dataset to the application. The synthetic dataset generating module(s) can be configured to generate the synthetic dataset based on the dataset.

18 Claims, 11 Drawing Sheets

(56) References Cited

U.S. PATENT DOCUMENTS

| | | | |
|---|---|---|---|
| 8,976,030 | B2 | 3/2015 | Cunningham et al. |
| 9,100,194 | B2 | 8/2015 | Mister et al. |
| 9,106,646 | B1 | 8/2015 | Zheng |
| 9,813,236 | B2 | 11/2017 | Buer |
| 9,871,791 | B2 | 1/2018 | Blinn |
| 10,122,715 | B2 | 11/2018 | Dispensa |
| 10,129,260 | B1 * | 11/2018 | Statica .............. H04L 63/1466 726/4 |
| 10,223,520 | B2 | 3/2019 | Oberheide et al. |
| 10,256,979 | B2 * | 4/2019 | Mahaffey ............ G06F 21/577 713/176 |
| 10,826,910 | B2 | 11/2020 | Disraeli |
| 2007/0165811 | A1 * | 7/2007 | Reumann ........... H04L 65/1079 379/201.01 |
| 2015/0347734 | A1 * | 12/2015 | Beigi .................. H04L 9/3268 726/28 |
| 2017/0353450 | A1 * | 12/2017 | Koved ................ H04L 63/045 |
| 2018/0007041 | A1 | 1/2018 | Davis et al. |
| 2018/0205686 | A1 * | 7/2018 | Jolly .................. H04L 63/0435 |
| 2018/0205725 | A1 * | 7/2018 | Cronkright ......... H04L 63/0838 726/7 |
| 2018/0225653 | A1 * | 8/2018 | Vokes ................. H04W 12/06 705/71 |
| 2019/0028178 | A1 * | 1/2019 | Oh ....................... H04W 40/22 726/28 |
| 2019/0065709 | A1 * | 2/2019 | Salomon ............... H04L 9/0643 713/168 |
| 2020/0036832 | A1 * | 1/2020 | Hodge ................ H04M 17/10 455/411 |
| 2020/0259829 | A1 * | 8/2020 | Shaffer ................ H04W 12/06 713/153 |
| 2021/0037135 | A1 * | 2/2021 | Meredith ............. H04M 3/436 379/210 |
| 2022/0052985 | A1 * | 2/2022 | Walters ................ H04L 63/108 713/170 |
| 2022/0060467 | A1 * | 2/2022 | Montgomery ....... H04L 9/3271 713/156 |
| 2022/0150066 | A1 * | 5/2022 | Sugarev .............. H04L 9/3263 |
| 2022/0217000 | A1 * | 7/2022 | Seaborn .............. H04L 9/0894 |

FOREIGN PATENT DOCUMENTS

| | | | | |
|---|---|---|---|---|
| WO | WO-2018014630 | A1 * | 1/2018 | ............ H04L 9/32 |
| WO | WO-2020242700 | A1 * | 12/2020 | ............ G06F 21/44 |

\* cited by examiner

SYSTEM, METHOD, AND COMPUTER-ACCESSIBLE MEDIUM FOR DETERMINING THE VERACITY OF A BANK FRAUD CALL

FIELD OF THE DISCLOSURE

The present disclosure relates generally to call spoofing, and more specifically, to exemplary embodiments of an exemplary system, method, and computer-accessible medium for determining the veracity of a bank fraud call.

BACKGROUND INFORMATION

When a customer calls up a company or institution (e.g., a bank), the company will generally ask the customer for certain identifying information in order to verify that the customer is who they say they are. This can include providing biographical information regarding the customer, or certain private information, such as a social security number. In certain instances, the customer may have setup a password, which may be requested by the company when the customer calls. In certain other situations, a mobile phone number may be on file with the company. When the customer calls the company, the company sends a verification code (e.g., using a text message) to the customer's mobile phone number. Once the customer receives the verification code, they read it back to the company to verify that the customer is who they say they are.

The above procedure generally works well when the customer calls the company, s the company can store certain information about the customer to verify the customer's identity. However, in many circumstances, the company calls the customer, instead of the customer calling the company. In such a scenario, it can be difficult for the customer to verify the company, as the customer does not have any information that can be used to verify the company.

Thus, it may be beneficial to provide an exemplary system, method, and computer-accessible medium for determining the veracity of a bank fraud call, which can overcome at least some of the deficiencies described herein above.

SUMMARY OF EXEMPLARY EMBODIMENTS

An exemplary system, method, and computer-accessible medium for determining if a communication from a company is spoofed can include receiving a communication from a representative of the company, accessing an application(s) stored on a mobile device(s) to generate a one-time code, where the application(s) can include credentials associated with a user(s) stored therein, providing the one-time code to the company using the application(s), receiving the one-time code from the representative of the company, and determining if the communication from the company is spoofed based on the receipt of the one-time code from the representative. The one-time code can be received using the application(s). The one-time code can be generated using (i) the credentials of the user(s) or (ii) hardware characteristics of the mobile device(s).

In some exemplary embodiments of the present disclosure, the application(s) can be accessed to generate a push notification, the push notification can be provided to the company using the application(s), a verification of the push notification can be received using the application(s), and the communication from the company can be determined to be spoofed based on the verification of the push notification. A list of telephone numbers associated with the company can be accessed, a particular telephone number the communication was received over can be determined, the particular telephone number can be compared to the list of telephone number, the communication from the company can be determined to be spoofed based on the comparison. The representative associated with the particular telephone number can be determined using the application(s).

In certain exemplary embodiments of the present disclosure, the application(s) can be installed on the mobile device(s), a unique identification can be generated using the application(s) during the installation of the application(s), and the unique identification can be provided to the company during the installation of the application(s). The application(s) can be accessed to receive a further unique identification from the company, the further unique identification can be compared to the unique identification, and the communication from the company can be determined to be spoofed based on the comparison. An encrypted message(s) can be received from the company, a decryption procedure can be performed on the message(s) using a decryption key, and the communication from the company can be determined to be spoofed based on the decryption procedure. An encryption key can be generated based on the mobile device(s), the decryption key can be generated based on the mobile device(s), where the decryption key is associated with the encryption key, and the encryption key can be provided to the company using the application(s).

Additionally, an exemplary system, method, and computer-accessible medium for verifying that a communication between a company and a user is not spoofed, can include initiating the communication between the company and the user, receiving a verification request from an application stored on a mobile device associated with the user, where the verification request includes a one-time code, and where the application includes credentials associated with the user stored therein, receiving the one-time code using a further application, verifying the one-time code using the further application, and verifying that the communication between the company and the user is not spoofed based on the verification. The one-time code can be received from the company.

In some exemplary embodiments of the present disclosure, the verification request can further include a push notification, and the communication between the company and the user can be verified as not being spoofed by confirming the push notification. A unique identifier associated with a mobile device(s) of the user can be received, and the unique identifier can be provided to the application installed on the mobile device(s) when initiating the communication. An encryption key can be received from the user. The verification request can include a request for a message(s), the message(s) can be encrypted using the encryption key, and the communication can be verified as not being spoofed by providing the encrypted message(s) to the user. The message(s) can include a unique identifier associated with a mobile device of the user. The unique identifier can include (i) an International Mobile Equipment Identity number, (ii) a mobile equipment identifier number, (iii) an electronic serial number, or (iv) an international mobile subscriber identity number. A digital voiceprint associated with an employee of the company can be sent to a mobile device associated with the user.

Further, an exemplary system, method, and computer-accessible medium for determining if a communication from a company is spoofed, can include installing an application(s) on a mobile device associated with a user(s), generating an encryption key and an associated decryption key using the application(s), providing the encryption key to the company, receiving the communication from the company, performing a decryption procedure on the communication using the decryption key, and determining if the communication from the company is spoofed based on the decryption procedure.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

DETAILED DESCRIPTION OF EXEMPLARY EMBODIMENTS

The exemplary system, method, and computer-accessible medium is described herein in relation to a mobile device and an application installed on a mobile device. However, the exemplary system, method, and computer-accessible medium can be implemented on any computing device. For example, the exemplary system, method, and computer-accessible medium can be implemented on an application installed on a personal computer. Additionally, the exemplary system, method, and computer-accessible medium can be implemented in a browser (e.g., directly integrated into the browser or part of a browser extension). Further, a single application can be designed to implement each verification method described below, or multiple applications can be used.

The exemplary system, method, and computer-accessible medium, according to an exemplary embodiment of the present disclosure, can facilitate a customer to verify that a phone call received from a company is actually from the company, and not spoofed. For example, it can be easy for a bad actor to spoof the number from the company, to make it appear as if the bad actor is calling on behalf of the company in order to obtain private information from the customer. The exemplary system, method, and computer-accessible medium, according to an exemplary embodiment of the present disclosure, can utilize various verification methods, as discussed below, for a customer to use to verify that the call is not spoofed.

Figure 1:
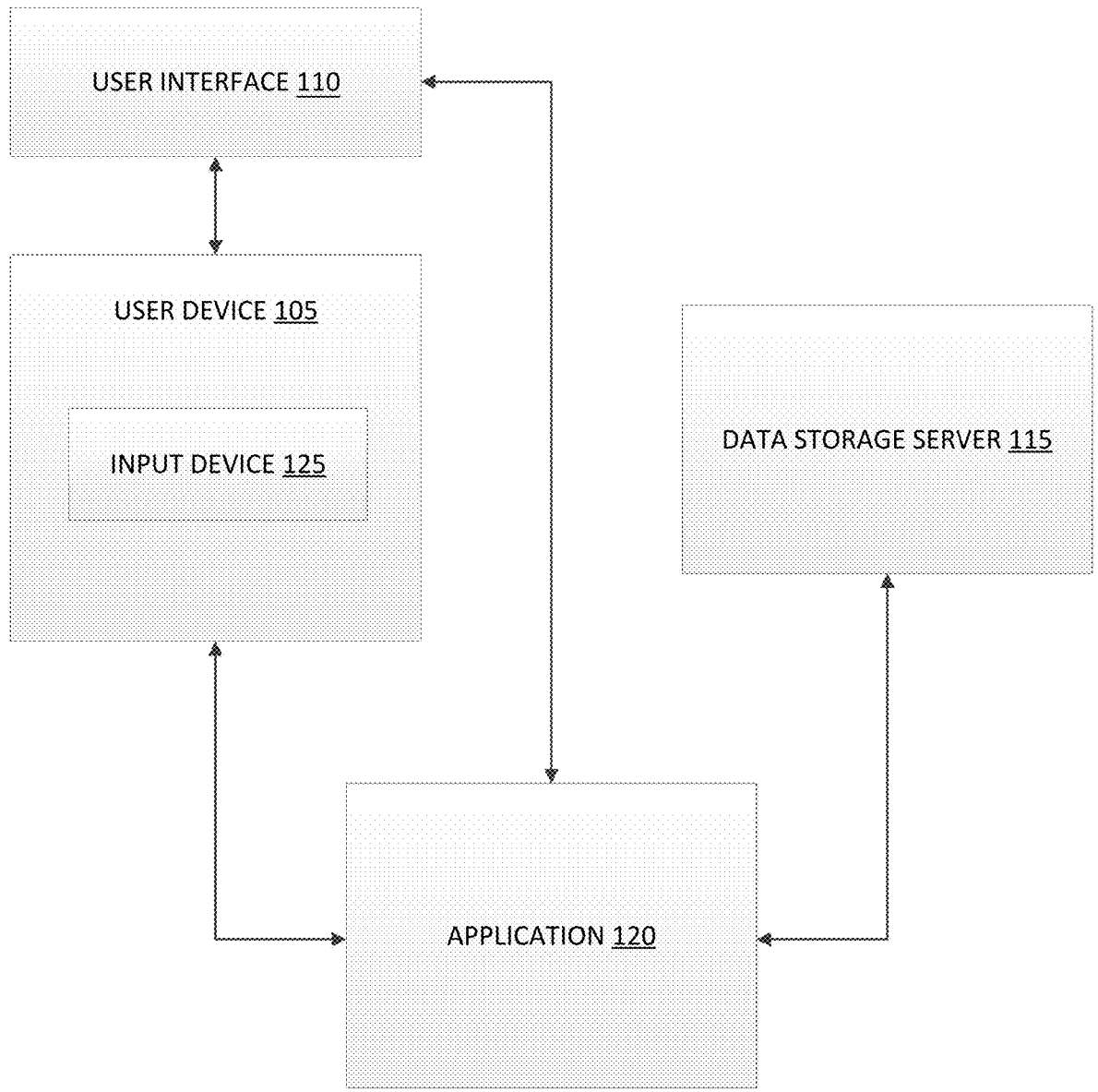
FIG. 1 is an exemplary diagram illustrating a device for secure messaging according to an exemplary embodiment of the present disclosure.

The exemplary system, method, and computer-accessible medium can facilitate secure communication between multiple devices using an application that can be stored on any communication device or apparatus. FIG. 1 illustrates a system according to an exemplary embodiment that can be used to facilitate secure communication as described herein. In particular, system 100 can include user device 105 displaying user interface 110, data storage server 115, and application 120 that can be communicatively connected to user interface 110 and data storage server 115. Input device 125 can be operably connected to user device 105 and can be used by a user to receive a secure message from a company, or send a push notification to a company, as described below.

User device 105 can be, but is not limited to, a smartphone, laptop, desktop computer, tablet computer, personal digital assistants, thin client, fat client, Internet browser, customized software application or kiosk, etc. It is further understood that user device 105 can be of any type of device that supports the communication and display of data and user input. The present disclosure is not limited to a specific number of user devices, and it is understood that the system 100 can include a single user device or multiple user devices. For example, multiple device can communicate with multiple devices.

User device 105 can include a memory. The memory can be a read-only memory, write-once read-multiple memory or read/write memory, for example, RAM, ROM and EEPROM. User device 105 can include one or more of these memories. A read-only memory can be factory programmable as read-only or one-time programmable. One-time programmability can provide the opportunity to write once then read many times. A write once/read-multiple memory can be programmed at a point in time after the memory chip has left the factory. Once the memory is programmed, it may not be rewritten, but it can be read many times. A read/write memory can be programmed and re-programed many times after leaving the factory. It can also be read many times.

User device 105 can further include wired or wireless data communication capability. These capabilities may support data communication with a wired or wireless communication network, including the Internet, a cellular network, a wide area network, a local area network, a wireless personal area network, a wide body area network, any other wired or wireless network for transmitting and receiving a data signal, or any combination thereof. The messages between devices can be transmitted using the data communication of the device. Additionally, the message read request, and any grant or denial, can also be transmitted using the data communication of the device. This network can include, without limitation, telephone lines, fiber optics, IEEE Ethernet 902.3, a wide area network, a local area network, a wireless personal area network, a wide body area network, or a global network such as the Internet. User device 105 can also, but need not, support a short-range wireless communication interface, such as near field communication, radio-frequency identification, and Bluetooth.

User device 105 can include at least one display and input device. The display can be any type of device for presenting visual information such as a computer monitor, a flat panel display, and a mobile device screen, including liquid crystal displays, light-emitting diode displays, plasma panels, and cathode ray tube displays. The input devices can include any device for entering information into the user device that is available and supported by user device 105, such as, for example, a touch-screen, keyboard, mouse, cursor-control device, touch-screen, microphone, digital camera, video recorder, or camcorder. These devices can be used to enter or receive information and interact with the system 100 as described herein.

User interface 110 can be displayed on user device 105. User interface 110 can be a program of software (e.g., an application, mobile or non-mobile) which can be run on user device 105 or a remote server. User interface 110 can be run on a remote server, which can be in data communication with user device 105. User interface 110 can be configured to receive input from a user via an input device operably connected to user device 105 (e.g., typing of a message and controlling access to the message). User interface 110, on the sending device, can receive a secure communication from a company in order to verify that a received call is actually from the company and not spoofed. User interface 110 can be communicatively connected to application 120 (e.g., an application provided by the company that can facilitate various exemplary verifications methods as described herein). Application 120 can be a single application designed and developed by a single company, and can be proprietary (e.g., it cannot interface with an application by another company). Alternatively, the underlying technology used for secure communication, which is described herein, can be application agnostic, and can be implemented on different applications developed by different companies.

Application 120 can be any software, program, email client, or web browser that supports the communication and display of data, information, and input received from a user and/or from a server or other application. Application 120 can include any plug-in, add-on, and/or extension associated with a software, program, email client, and/or web browser.

User interface 110 and/or application 120, can be, or can be run on, dedicated server computers, such as bladed servers, or can be personal computers, laptop computers, notebook computers, palm top computers, network computers, mobile devices, or any processor-controlled device capable of supporting the system 100.

Data storage server 115 can store the secure messages that can be sent between devices (e.g., between a receiving device and a sending device). Data storage server 115 can implement software logic-based isolation in order to prevent access to the message by the application 120 located on the receiving device. Software logic-based isolation can include utilizing an isolator, which can make decisions as to whether the application can access the secure message. Alternatively, hardware-based isolation schemes can be implemented.

For example, to remove the strain on a piece of software performing the isolation, hardware can be included that can isolate software inside a system. A particular software can manage the isolation enforcement via the hardware. Larger pre-TrustZone technology systems can utilize a piece of hardware to enforce the isolation policies of the system, for example, a Memory Management Unit ("MMU"). The MMU can split memory up into isolation regions based on tables, which can be held in isolated memory. If system 100 is implemented on a simple device (e.g., based on the number of processing cores) then the operating system ("OS") can easily manage the functionality of the trusted zone. However, for more complex systems, additional trusted zone schemes can be used. For example, TrustZone+ TEE techniques can put the access control at the peripheral or memory and separate its management from system design and software not focused on security. This isolation barrier can separate assets, giving two execution environments, which can prevail throughout the general assets of the system on chip ("SoC"): (i) a "Secure World" for running Trusted Code, the Secure world can host the Trusted Execution Environment ("TEE") and (ii) a "Normal" World for running general code. The Normal World can host the Rich OS Execution Environment ("REE"). The REE and the Rich OS do not have to be "Rich" in functionality; they just have to be outside the isolation boundary. With the introduction of Hypervisors inside this class of device, the Normal World can potentially host many of these Rich OSs. Generally, a TEE does not distinguish between different REE or Rich OS in a device except for message routing. From the TEE's point of view, Rich OS are all untrusted by the TEE, and so any distinction can be based on untrusted data. While FIG. 1 illustrates a single instance of user interface 110, data storage server 115, and application 120, it is understood that other embodiments may use multiple computer systems or multiple servers as necessary or desired to support a user and may also use back-up or redundant servers to prevent network downtime in the event of a failure of a particular server. It is further understood that in some embodiments, a plurality of additional data servers may store information and/or data utilized by the system 100.

The exemplary system, method, and computer-accessible medium can facilitate secure communication between the company and the customer for the customer to verify a phone call from the company. For example, an application can be installed on a mobile device of the customer. The application can include a secure messaging platform that can facilitate secure communication between only the customer and the company. When a representative of the company calls the customer, the customer can answer the phone call and then request a secure verification form the representative.

Figure 2:
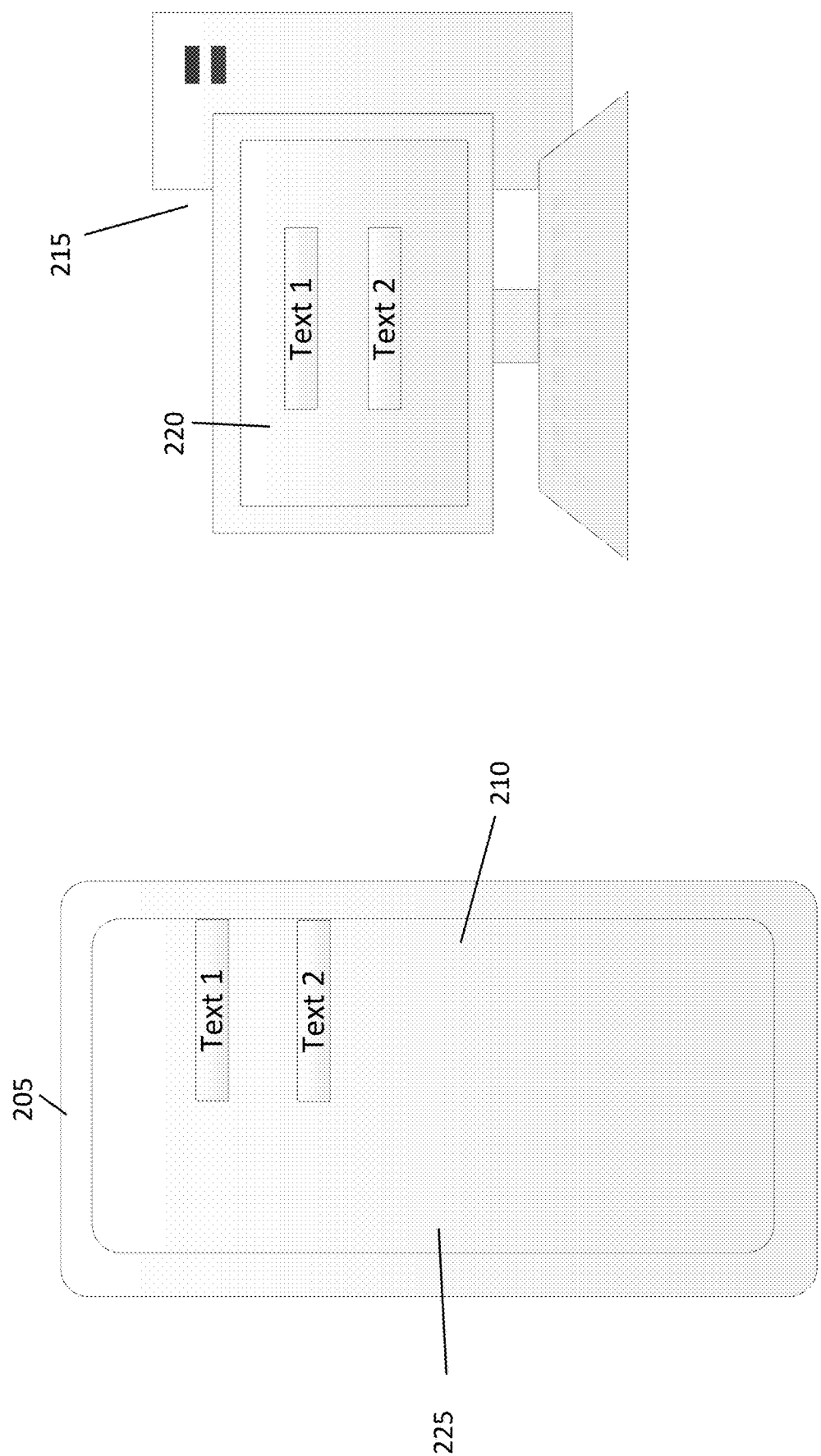
FIG. 2 is an exemplary diagram of a system for facilitating secure communication between a customer and a company according to an exemplary embodiment of the present disclosure.

FIG. 2 shows an exemplary diagram of a system for facilitating secure communication between a customer and a company according to an exemplary embodiment of the present disclosure. As shown in FIG. 2, a customer can have a mobile device 205. An application 210 can be installed on mobile device 205. Application 210 can facilitate secure communication between the customer and the company. A representative of the company can access a computer 215, which can be a desktop, laptop, tablet, etc. An application 220 can be installed on computer 215, which can facilitate the secure communication with application 210 installed on mobile device 205. When the representative calls the customer, the customer can ask for a verification from the representative. The representative can access application 220 and send a secure communication to application 210. If the customer receives the secure communication using application 210, then the customer has verified that the representative is actually from the company, as a spoofer will not have access to the secure messaging platform.

The secure communication platform facilitated by the exemplary system, method, and computer-accessible medium can be only between the company and the customer. Thus, the actual verification message sent from application 220 to application 210 may not matter. For example, the secure message can simply be the word "hi." However, in order to facilitate an additional layer of security, a predetermined message can be sent from application 220 to application 210. The secure message can be any combination of alphanumeric characters, and can be any length. For example, when the customer installs application 210 on mobile device 205, the customer can setup a passcode or phrase. This can be sent to the company, and stored on the company's server. When the customer requests verification from the person calling, the representative can access the passcode or phrase and send it using application 220. The customer can then receive the passcode or phrase using application 210. If the passcode or phrase matches, then the representative is verified as being from the company and not a spoofed call.

As shown in FIG. 2, device 205 can be any device as described herein (e.g., a mobile device, tablet, computer, etc.). Additionally, device 205 can be one type of device (e.g., a mobile phone) while device 215 can be a different type of device (e.g., a desktop computer). Device 205 can include a display 225, which can be used to display information to the user of device 205. Display 225 can also function as input devices (e.g., having touchscreens embedded on or under the display device).

When a chat is initiated between device 205 and 215, an encryption mechanism, for example, pretty good privacy ("PGP") can be setup between the two devices. The company representative using device 215 can then input one or more messages. The messages can be transmitted to device 205, and can be shown on display 225. However, prior to device 215 sending a message to device 205, device 215 can encrypt the message using any suitable encryption method/scheme, as described herein. The encrypted messages can then be transmitted to device 205, decrypted by device 205, and then viewed by the user of device 205 using display 225.

The exemplary system, method, and computer-accessible medium can implement a hash in order to confirm the security of the messaging applications. For example, when an application is downloaded, (e.g., a particular version of the application), it can have a hash associated with that specific version, which can indicated that code is unmodified. The exemplary system, method, and computer-accessible medium can check the version of that code against the version of the code that can be publically available (e.g., on GitHub or the app store) in order to ensure that it is not a corrupted version of that code. When encryption/decryption is established between two devices (e.g., by initiating a chat) the application versions can be communicated with each other. Additionally, a binary can be built (e.g., a build). This binary can still have the hash associated with it, and can be the individual zeros and ones that create the code. This can be referred to as a build hash. If the code of the application is modified, however, then the hash will not match, indicating a corrupted version of the code (e.g., it could be a modified application intended to circumvent control of the decryption key from the sender).

The OS can control the binary and can install the application on the device. Thus, the version of the application being run can be verified (e.g., through the provider of the application, for example the Apple iTunes store or the Google Play store). When a customer sends a message to another customer (e.g., a sender sends a message to a receiver), the customer's response can include the hash. If the hash matches, then the message can be sent (e.g., the encrypted message).

In addition to using the hash, another secret key can be stored inside of the binary. Then only that binary of that specific version would be able to decrypt a message. In order to maintain backwards compatibility with different versions of the application, binaries from previous versions can be stored in updated versions. However, older versions of the application may not be able to have the same functionality when communicating with newer versions of the application (e.g., the old application may be able to decrypt messages from newer versions of the application, but may not be able to verify newer versions of the application in order to send encrypted messages).

The exemplary application installed on the customer's device can also be used to facilitate voice communication between the customer and the company using a voice over Internet protocol ("VoIP"). For example, when the company calls the customer using standard telephone service, the customer can request that the company switch VoIP, which can be integrated into the application. The VoIP in the application can be setup such that a voice connection can only be made between the application installed on the customer's device and software run by the company (e.g., on the company's servers). A spoofer will not be able to imitate a VoIP call as the spoofer will not have access to the VoIP connection between the customer and the company.

The exemplary system, method, and computer-accessible medium can be used to verify that the representative of the company is not spoofing the call using a code (e.g., a pin code or a passcode). The code can be any combination of alphanumeric characters, and can be any length. The code can be set by the customer with the company. Thus, whenever a representative calls the customer, the customer can request the code for verification. If the caller is unable to provide the correct code, then the customer can know that the call is spoofed. However, if the caller provides the correct code, then the customer can know that the call is not spoofed.

Figure 3:
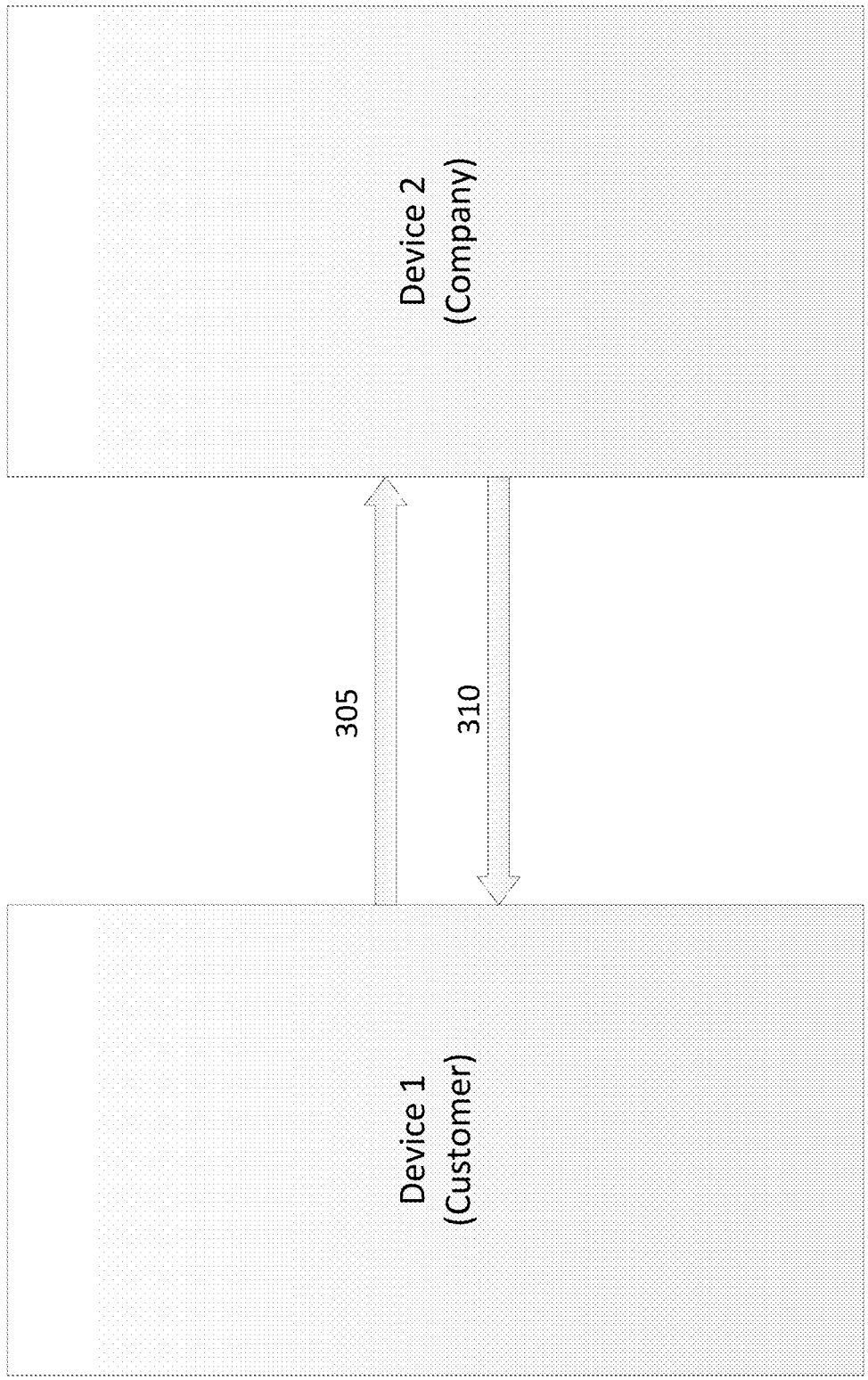
FIG. 3 is an exemplary diagram of a system for providing a code for verification according to an exemplary embodiment of the present disclosure.

The code can be a static code set by the customer, or automatically generated by an application installed on the customer's device, and then sent and stored on a server operated by the company. The code can then be accessed by any representative of the company when calling the customer. However, the code can also be a single use code. For example, FIG. 3 shows an exemplary diagram of a system for providing a code for verification according to an exemplary embodiment of the present disclosure. Using an exemplary application installed on the customer's device, the customer can enter a code directly into the application. The application can transmit the code (procedure 305) to the company, which can be accessed by the representative. The representative can then provide the code back to the customer (procedure 310). The code (e.g., the static code or the one-time code) can be provided verbally by the representative to the customer. Alternatively, the code can be entered into a different application by the representative, and then transmitted back to the application used by the customer, or a different application. The customer can manually verify the code by reviewing the code received by the application from the representative. Alternatively, the application can automatically verify the code received from the representative by comparing it to the code sent to the representative.

The code can be manually set by the customer by entering the code into the application on the customer's mobile device. Alternatively, the customer can have the application automatically generate a secure code and send it to the company. The application can also provide the automatically generated secure code to the customer to manually check the code against the code that the representative received. Alternatively, as described above, the representative can enter the received code into an application, which can automatically transmit the code back to the application installed on the customer's device for automatic verification. Additionally, a code can be generated by the application and displayed on the customer's mobile device. The company can have access to an application that can generate its own code based on the same parameters used by the application installed on the customer's device. Thus, the code generated by the company will match the code generated by the customer's device. When the customer receives a phone call, the customer can request that the person calling provide the dynamic verification code. The customer can then check the dynamic verification code against the one generated by the customer's mobile device to determine if they match.

When automatically generating the code (e.g., the static code or the one-time code), the application can use various parameters related to the customer or related to the customer's mobile device. For example, the code can be generated based on the credentials of the customer (e.g., a username and password of the customer that can be associated with an account that the customer has with the company). The code can also be generated based on the hardware characteristics of the customer's mobile device. For example, the code can be generated based on a unique telephony number associated with the customer's mobile device. The unique telephony number can be an International Mobile Equipment Identity ("IMEI") number, which can be used to identify GSM, and WCDMA mobile phones, as well as some satellite phones. The unique telephony number can also be a Mobile Equipment IDentifier ("MEI") number, which is a globally unique number identifying a physical piece of CDMA mobile station equipment. Additionally, the Electronic Serial Number ("ESN") of the device can be used, or an International Mobile Subscriber Identity ("IMSI") number can be used.

In addition to the unique telephone numbers, a media access control ("MAC") address associated with the customer's mobile device can be used. If the device is an Android device, then a secure Android ID can be used, which can be a value randomly generated on a device's first boot. Additionally, a unique ID can be automatically assigned to the customer's mobile device when the application is installed on the device.

Push notifications are clickable pop-up messages that appear on a device (e.g., a mobile device, computer, browser, etc.), irrespective of which device they use or which browser they are on. Subscribers can be anywhere on the device or the browser and still receive these messages as long as they are online or have their browsers running on their devices. The customer can access an exemplary application installed on their device and initiate a push notification. The push notification can be sent to the company, and can appear on a device being used by the company's representative. The representative can receive a popup message on their device indicating the receipt of a push notification. The representative can then confirm the push notification. This confirmation can be provided back to the application installed on the customer's device. If the confirmation is provided back to the application installed on the customer's device, then the customer can know that the representative is not a spoofer.

Figure 4:
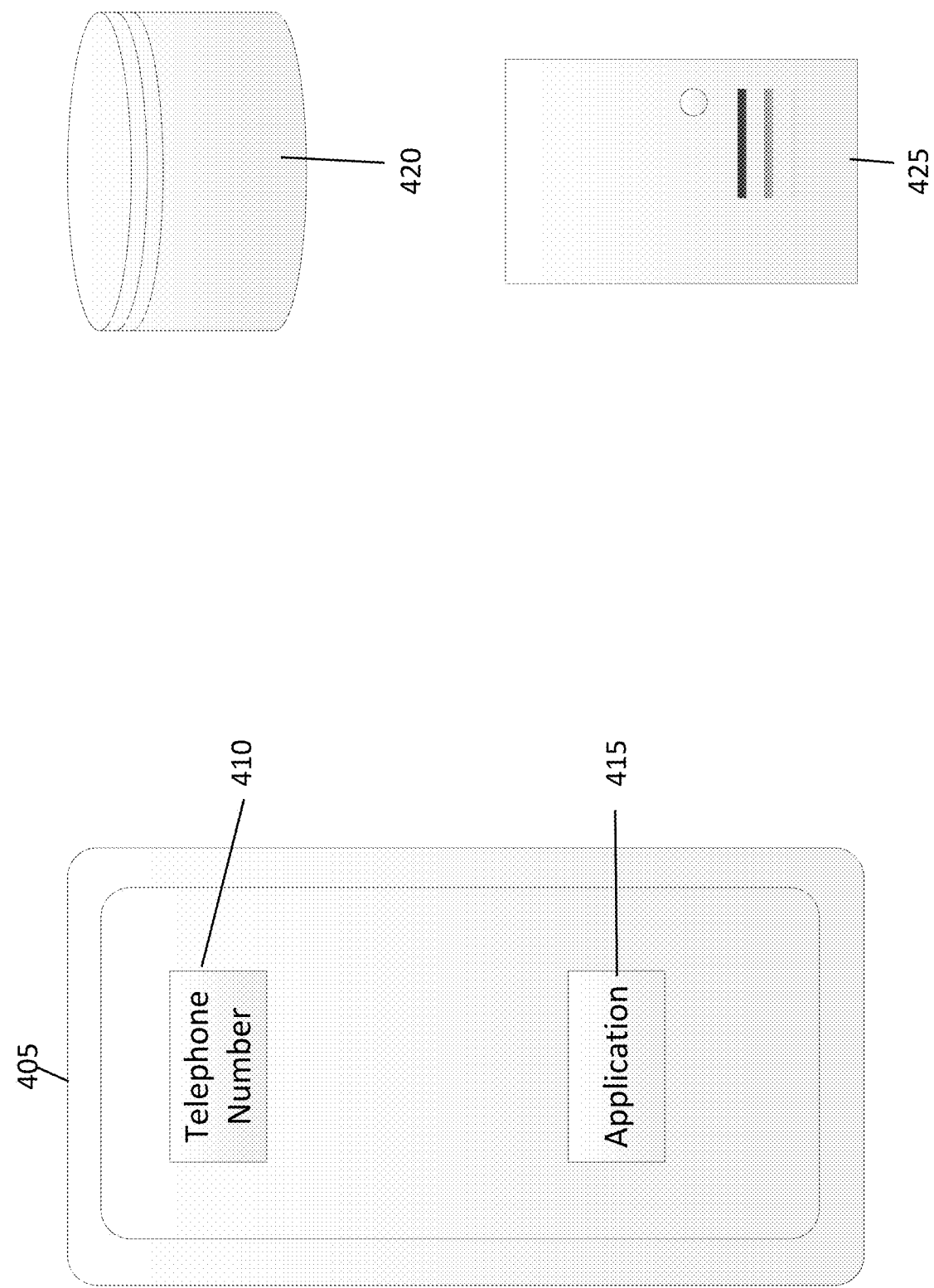
FIG. 4 is an exemplary diagram of a system for verifying that a call is not spoofed using a phone number of the caller according to an exemplary embodiment of the present disclosure.

FIG. 4 shows an exemplary diagram of a system for verifying that a call is not spoofed using a telephone number of the caller according to an exemplary embodiment of the present disclosure. For example, when a customer receives a call using device 405 from a company, the telephone can determine a telephone number 410 associated with the caller. Application 415 can received the telephone number 415 to determine if it is correct. In order to determine if telephone number 410 is correct, application 415 can access a database 420, which includes a list of numbers associated with the company. Application 415 can check database 420 to determine if telephone number 410 is a telephone number associated with the company. If telephone number 410 is not associated with the company, then the customer can know that the call is spoofed. If telephone number 410 is associated with the company, then the call may not be spoofed. However, an additional check can be performed as discussed below.

If telephone number 410 is associated with the company, which can be determined by application 415 accessing database 420, a second check can be performed to compare the specific telephone number associated with the representative on the phone. For example, if telephone numbers are statically assigned to each employee (i.e. each employee has their own telephone number), then the customer can input the name of the person calling into application 415. Application 415 can access database 420 and determine the specific telephone number associated with the name provided by the person over the phone. Application 415 can then compare the telephone number obtained from database 420 to telephone number 410 to determine if they match. If they do not match, then the customer can know that the call has been spoofed. If the number does match, then the call may not be spoofed. However, an even further check can be performed as discussed below.

For example, after application 415 has compared telephone number 415 to a number associated with the company using database 420 (e.g., by determining a telephone number stored in database 420 based on the name provided by the person on the phone), application 415 can then access server 425. Application 415 can provide telephone number 410 to server 425. Server 425 can then determine if telephone number 410 is actually in use by someone at the company (e.g., did a person at the company actually initiate a call over telephone number 410). Server 425 can then provide information to application 415 as to whether telephone number 410 is actually in use at the company. If telephone number 410 is not in use at the company, then the customer can know that the call is spoofed. If telephone number 410 is actually in use at the company, then the customer can know that the call is not spoofed.

The above procedures can be based on a static phone number assigned to each employee. However, in many companies, dynamic phone numbers are assigned (i.e. a different phone number is assigned to each employee when they make a phone call). In order to determine if telephone number 410 is associated with a company, when the company uses dynamic telephone number assignment, application 415 can first access database 420 to determine if telephone number 410 is associated with the company. If it is not associated with the company, then the customer can know that the call has been spoofed. If telephone number 410 matches a telephone number in database 420, then application 415 can then provide telephone number 410, along with the name of the person calling to server 425. 425 can be used to determine if telephone number 410 is currently assigned to an employee having the name provided by application 415. If telephone number 410 is not currently assigned to an employee having the name provided by application 415, then the customer can know that the call has been spoofed. However, if telephone number 410 is currently assigned to an employee having the name provided by application 415, then the customer can know that the call has not been spoofed.

Figure 5:
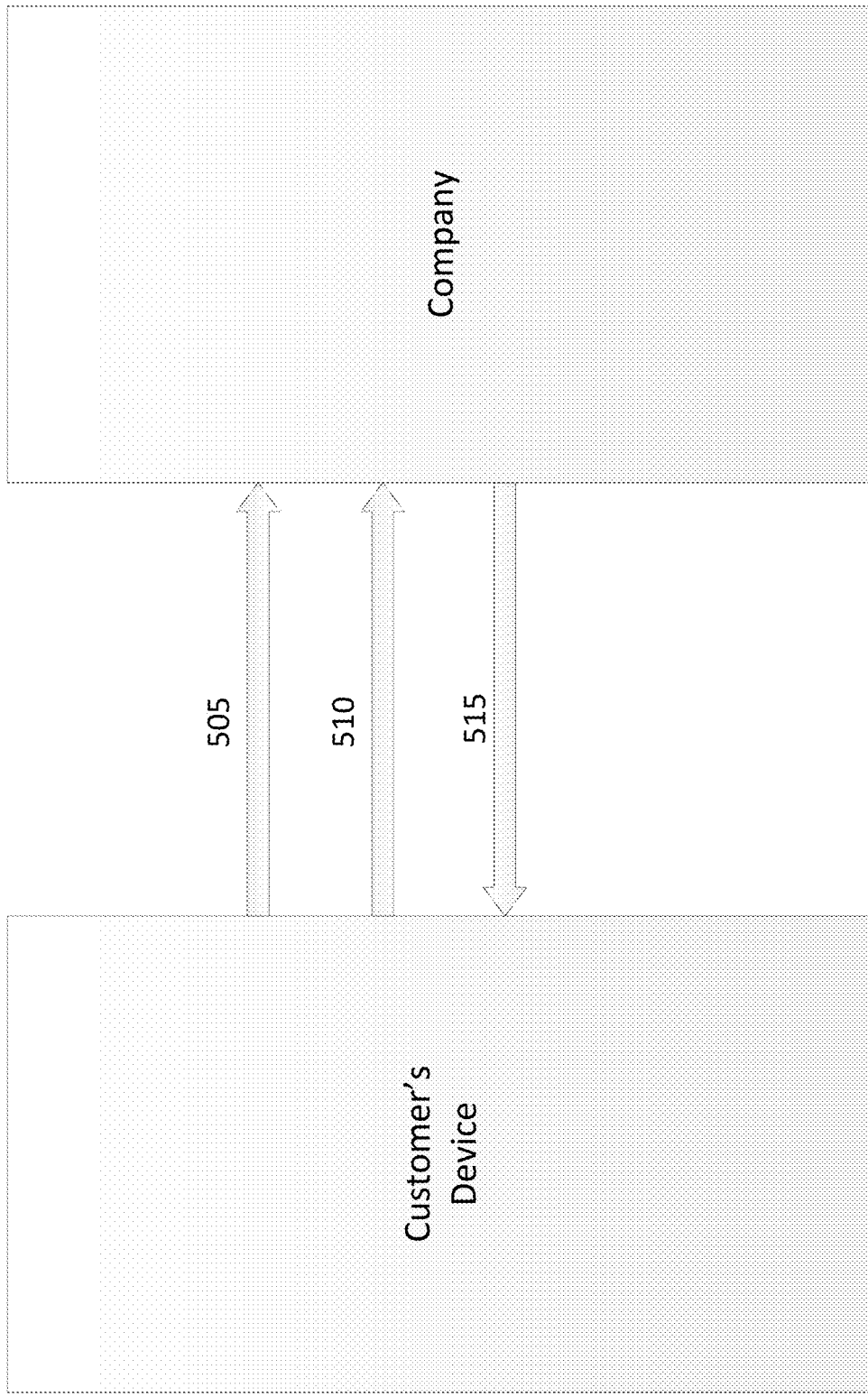
FIG. 5 is an exemplary diagram of a system for verifying that a call is not spoofed using encryption according to an exemplary embodiment of the present disclosure.

FIG. 5 shows an exemplary diagram of a system for verifying that a call is not spoofed using encryption according to an exemplary embodiment of the present disclosure. For example, the customer's device can generate an encryption and decryption key. The encryption/decryption pair can be generated using any suitable encryption/decryption procedure as described herein, and the encryption/decryption pair can be based on attributes of the customer (e.g., biographical information, phone information, etc.). Once the encryption/decryption pair has been generated, the customer's device, at procedure 505, can send the encryption key to the company. The company can store the encryption key for use when communicating with the specific customer.

When the customer receives a call from the company, the customer can access an application installed on the customer's device requesting verification from the company. A verification request can be sent from the customer's device to the company at procedure 510. The company can generate a message, and encrypt the message using the specific encryption key associated with the customer. The company can then send the encrypted message to the customer's device at procedure 515. The application installed on the customer's device can then attempt to decrypt the message. If the decryption fails, then the message was not encrypted with the correct encryption key. Thus, the customer can know that the call was spoofed. However, if the decryption is successful, then the customer can know that the call is not spoofed as only the company would have the correct encryption key.

In such a scenario above, the exact phrase sent in the encryption method can be inconsequential, as the mere fact that the decryption is successful means that the call is not spoofed. However, for added security, a preset passcode or phrase can be sent in the encrypted message. The customer can then verify that the decrypted message is indeed the preset passcode or phrase.

The exemplary system, method, and computer-accessible medium, according to an exemplary embodiment of the present disclosure, can also use a voiceprint associated with the caller to determine if the call is spoofed. For example, an application stored on the customer's mobile device can record a voiceprint of the caller. The application can then access a database that includes voiceprints associated with the company to determine if the recorded voiceprint matches a stored voiceprint. If the recorded voiceprint does not match the stored voiceprint, then the customer can know that the call has been spoofed. If the recorded voiceprint matches the stored voiceprint, then the customer can know that the call is not spoofed.

As an alternative to the application recording a voiceprint, the customer can request a voiceprint from the representative. The representative can send a digital file to the customer's mobile device, which can be accessed by the application installed on the customer's device. The application can then access a database that includes voiceprints associated with the company to determine if the received voiceprint matches a stored voiceprint. If the received voiceprint does not match the stored voiceprint, then the customer can know that the call has been spoofed. If the received voiceprint matches the stored voiceprint, then the customer can know that the call is not spoofed.

Figure 6:
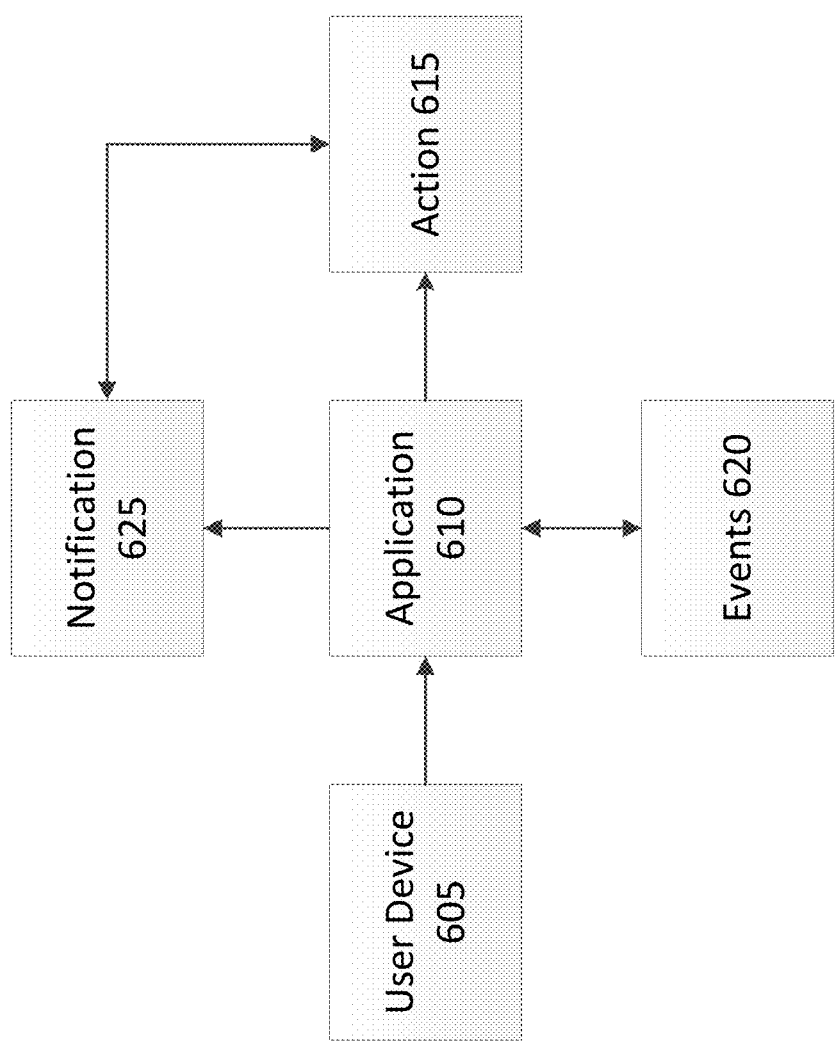
FIG. 6 is an exemplary diagram of a notification system according to an exemplary embodiment of the present disclosure.

FIG. 6 is an exemplary diagram of a notification system 600 according to an exemplary embodiment of the present disclosure. Notification system 600 can include customer device 605 operating one or more applications 610 within, or in connection with, a web browser, or using one or more built-in notification systems 625 that can be available (e.g., notification systems provided by the operating system of the device). Application 610 can alert the customer that a call has been spoofed, or that the call has not been spoofed (i.e. is legitimate) by presenting alerts in a browser and/or elsewhere on the customer device 605, for example, using a popup notification, a badge, or by changing the icon status related to the application that facilitates a user to grant or deny a request. Notifications can be initiated when a secure message is sent from the company to the customer to verify that the company is calling, and that the call is not spoofed. The alerts can include the display of an icon or graphic, a change in the color, size, or shape of an already displayed icon or graphic, a push notification, a pop-up notification, a prompt, a pop-window, or other visual alerts, audible alerts (e.g., a verbal alert, playing a sound, playing a song or a portion of a song, playing a ring tone), a physical alert (e.g., a vibration or haptic alert), and a combination thereof.

Application 610 can be software additions that allow for the customization of computer programs, applications, and browsers as well as the customization of website content. Application 610 can be a software program implemented with hypertext markup language (HTML), JavaScript, cascading style sheets ("CSS") and other web-based technologies. Application 610 can also be a notification system built into the operating system that user device 605 runs. For example, the iOS and Android operating systems include built-in notification systems that can be used by applications installed on the operating system. Application 610 can perform data-based customization functions, which can include providing alerts, such as push notifications. In system 600, the user can take action 615 such as reviewing the secure message sent by the company.

The exemplary system, method, and computer-accessible medium, according to an exemplary embodiment of the present disclosure, can use any suitable encryption scheme to encrypt the messages and/or the sensitive information. The encryption algorithm can be used to convert the plaintext data into cipher text that can conceal the original content. The plaintext data can be restored from the cipher text through the decryption key. The encryption can be symmetric (e.g., secret-key encryption) or asymmetric (e.g., public-key encryption). Symmetric-key encryption algorithms can use the same or different keys for encryption and decryption. This type of encryption is fast and suitable for bulk data processing. Since everybody who has access to the key is able to decrypt the encrypted content, this method requires careful key management. Public-key encryption algorithms operate with two separate keys: the public key and the private key. The public key can be distributed freely while the private key should not be shared with anyone. If public key encryption is used, then the receiving device or the company can maintain a copy of the public key that can be used for encryption. For example, the sending device (e.g., or the customer) can use a single secret decryption key, which can be associated with a single public encryption key. The sending device, or the customer, can initially encrypt the message or the sensitive information using the public encryption key. When the sending device or customer grants access to the message, or sensitive information, as applicable, the receiving device or the company can automatically reencrypt the message or sensitive information, using the public key associated with the receiving device or customer, as applicable. Using a single public encryption key that is associated with a single decryption key can be easier to keep track of. However, this can be less secure, as the accidental divulgence of the single decryption key would allow access to all information (e.g., messages and sensitive information) encrypted using the public key. Thus, as an alternative to single public key encryption, multiple encryption/decryption key pairs can be used.

The encryption/decryption schemes described herein, which can be used to verify that the caller is from a specific company, and which facilitate a sender/customer to control access to their messages and information, can be different from end-to-end encryption, which can also be used. Thus, two levels of encryption/decryption can be used. The exemplary system, method, and computer-accessible medium can utilize end-to-end encryption when setting up a secure message chat between the sending device and the receiving device, or when transmitting the encrypted sensitive information from the customer to the company. End-to-end encryption can be used to scramble the messages and the encrypted sensitive information, and only the sender and the receiver of the messages have the "keys" to perform the initial decryption. However, the initial decryption, based on end-to-end encryption will not allow the receiving device or the company to actually access the message or the sensitive information.

The encryption/decryption pair can be generated using various suitable methods. For example, attributes related to the device used to encrypt the messages and/or sensitive information can be used to generate the keys. For example, based on the use of a device by each person, the device will have unique attributes associated with it. These attributes can be based on storage size, amount of storage used, contact information, numbers of applications installed, number of messages sent, accounts activated on the device, etc. All of this information can be used to generate one or more unique keys for the device to use to encrypt/decrypt messages and sensitive information.

Additional encryption can be included, which can be based on a passcode, a fingerprint, or a facial identification ("ID"). For example, if a request to read a message is granted, and the message is decrypted, the message can still be encrypted based on a passcode, a fingerprint, or a facial ID associated with the receiver. Thus, when attempting to read the message, the viewer will be prompted to unlock the message using the passcode, fingerprint, or facial ID. If a passcode is used, the passcode can be the same as the passcode to access the device itself, or a different passcode can be used. The use of a passcode, fingerprint, or facial ID, can add an additional layer of security. Thus, even if a person has gained access to the receiver's device, they still will not be able to view the message.

Figure 7A:
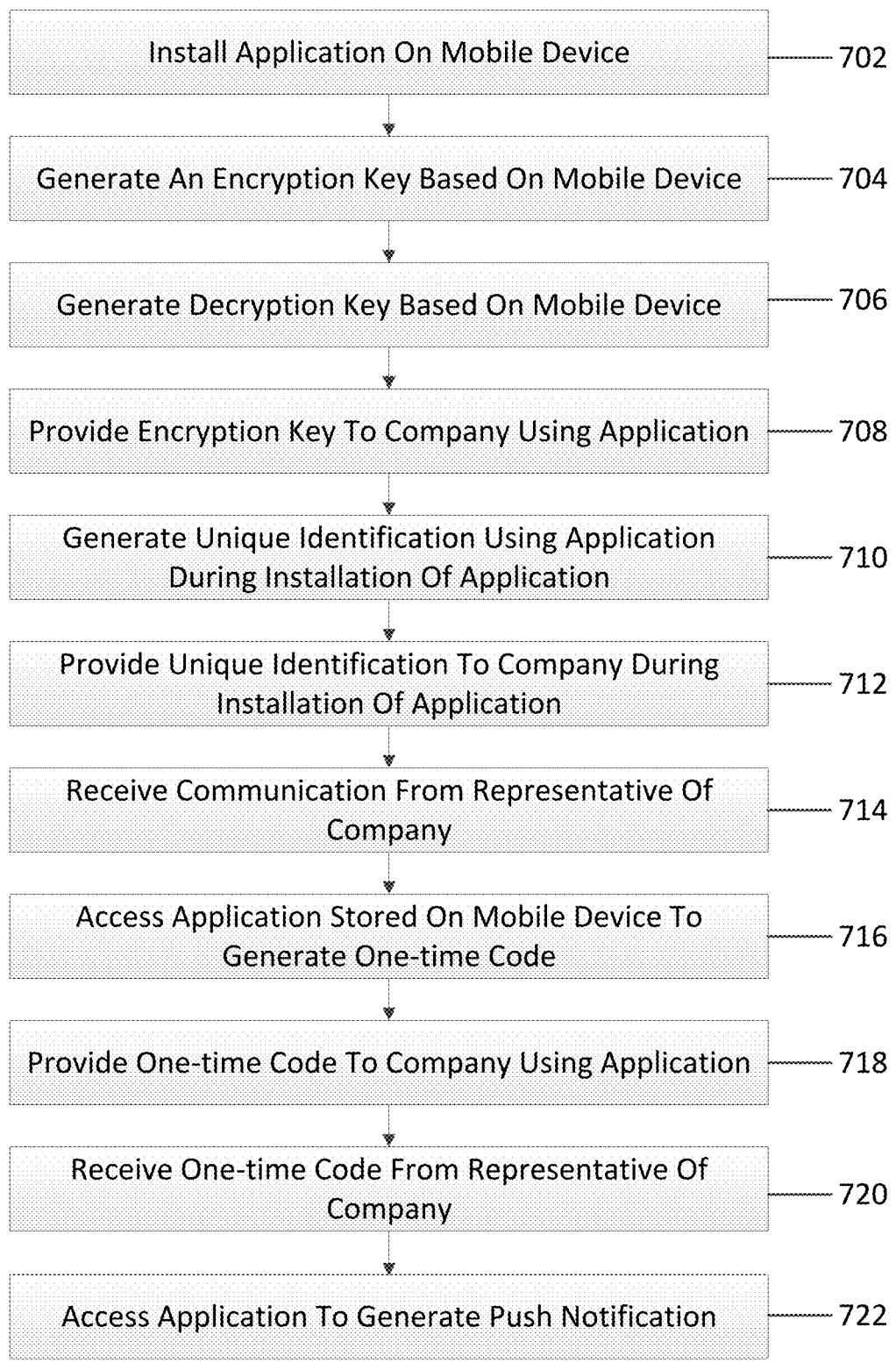
FIGS. 7A and 7B are flow diagrams of a method for determining if a communication from a company is spoofed according to an exemplary embodiment of the present disclosure.
Figure 7B:
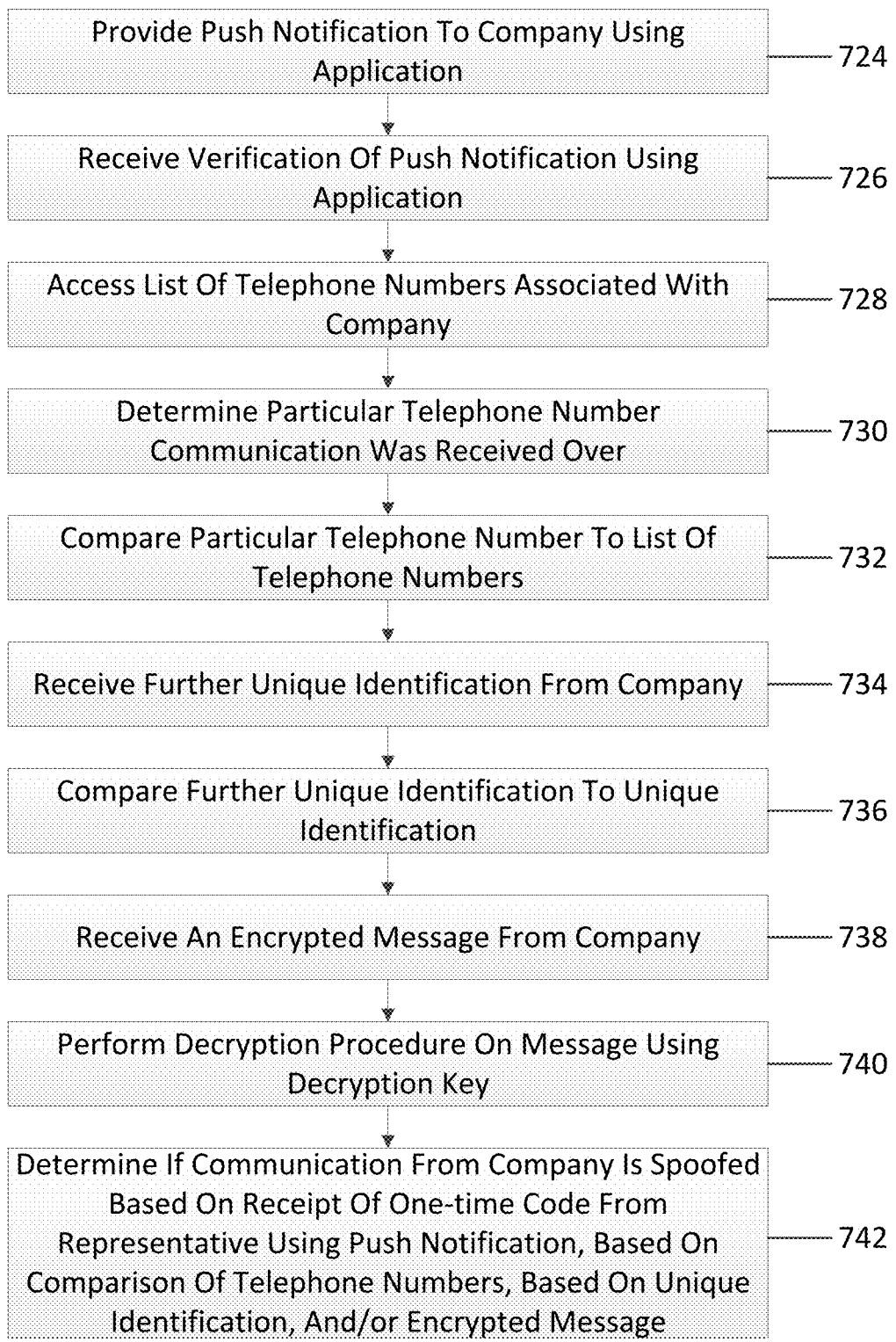

FIGS. 7A and 7B are flow diagrams of a method 700 for determining if a communication from a company is spoofed according to an exemplary embodiment of the present disclosure. For example, at procedure 702, the application can be installed on the mobile device. At procedure 704, an encryption key can be generated based on the mobile device. At procedure 706, a decryption key can be generated based on the mobile device. At procedure 708, the encryption key can be provided to the company using the application. At procedure 710, a unique identification can be generated using the application during the installation of the application. At procedure 712, the unique identification can be provided to the company during the installation of the application. At procedure 714, communication from a representative of the company can be received. At procedure 716, the application stored on mobile device can be accessed to generate a one-time code. At procedure 718, the one-time code can be provided to the company using the application. At procedure 720, the one-time code can be received from a representative of the company.

Figure 8:
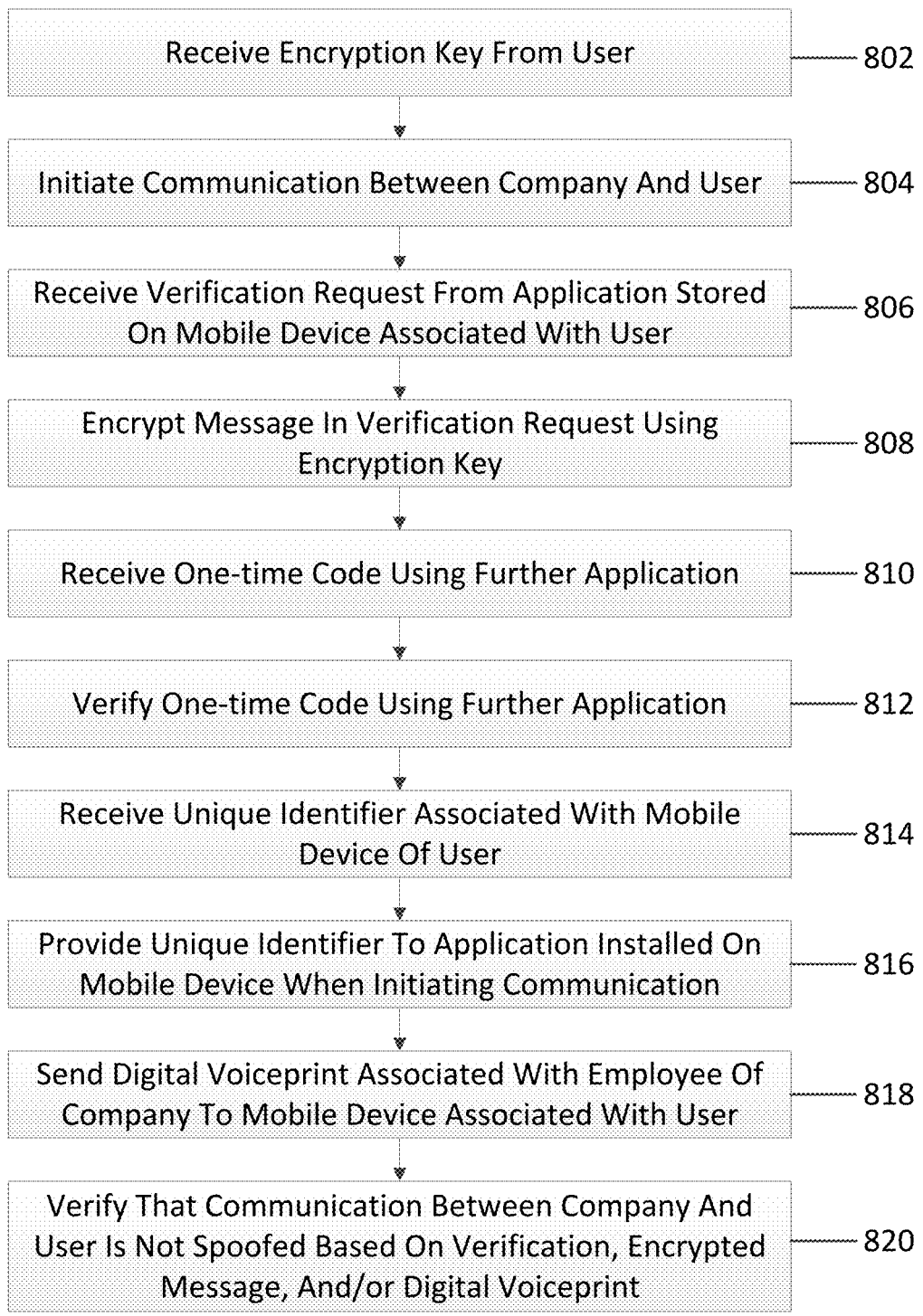
FIG. 8 is a flow diagram of a method for verifying that a communication between a company and a user is not spoofed according to an exemplary embodiment of the present disclosure.

Additionally, as shown in FIGS. 7A and 7B, at procedure 722, the application can be accessed to generate a push notification. At procedure 724, the push notification can be provided to the company using the application. At procedure 726, a verification of the push notification can be received using the application. At procedure 728, a list of telephone numbers associated with the company can be accessed. At procedure 730, a particular telephone number the communication was received over can be determined. At procedure 732, the particular telephone number can be compared to the list of telephone numbers. At procedure 734, a further unique identification can be received from the company. At procedure 736, the further unique identification can be compared to the unique identification. At procedure 738, an encrypted message can be received from the company. At procedure 740, a decryption procedure can be performed on the message using a decryption key. At procedure 742, the communication from the company can be determined to be spoofed based on the receipt of the one-time code from the representative using the push notification, based on the comparison of the telephone numbers, based on the unique identification, and/or the encrypted message FIG. 8 is a method 800 for determining if a communication from a company is spoofed according to an exemplary embodiment of the present disclosure. For example, at procedure 802, an encryption key can be received from a user. At procedure 804, the communication between the company and the user can be initiated. At procedure 806, a verification request can be received from an application stored on a mobile device associated with the user. At procedure 808, a message in the verification request can be encrypted using the encryption key. At procedure 810, the one-time code can be received using a further application. At procedure 812, the one-time code can be verified using the further application. At procedure 814, a unique identifier associated with mobile device of the user can be received. At procedure 816, the unique identifier can be provided to the application installed on the mobile device when initiating the communication. At procedure 818, a digital voiceprint associated with an employee of the company can be sent to a mobile device associated with the user. At procedure 820, the communication between the company and the user can be verified as not spoofed based on the verification, the encrypted message, and/or the digital voiceprint.

Figure 9:
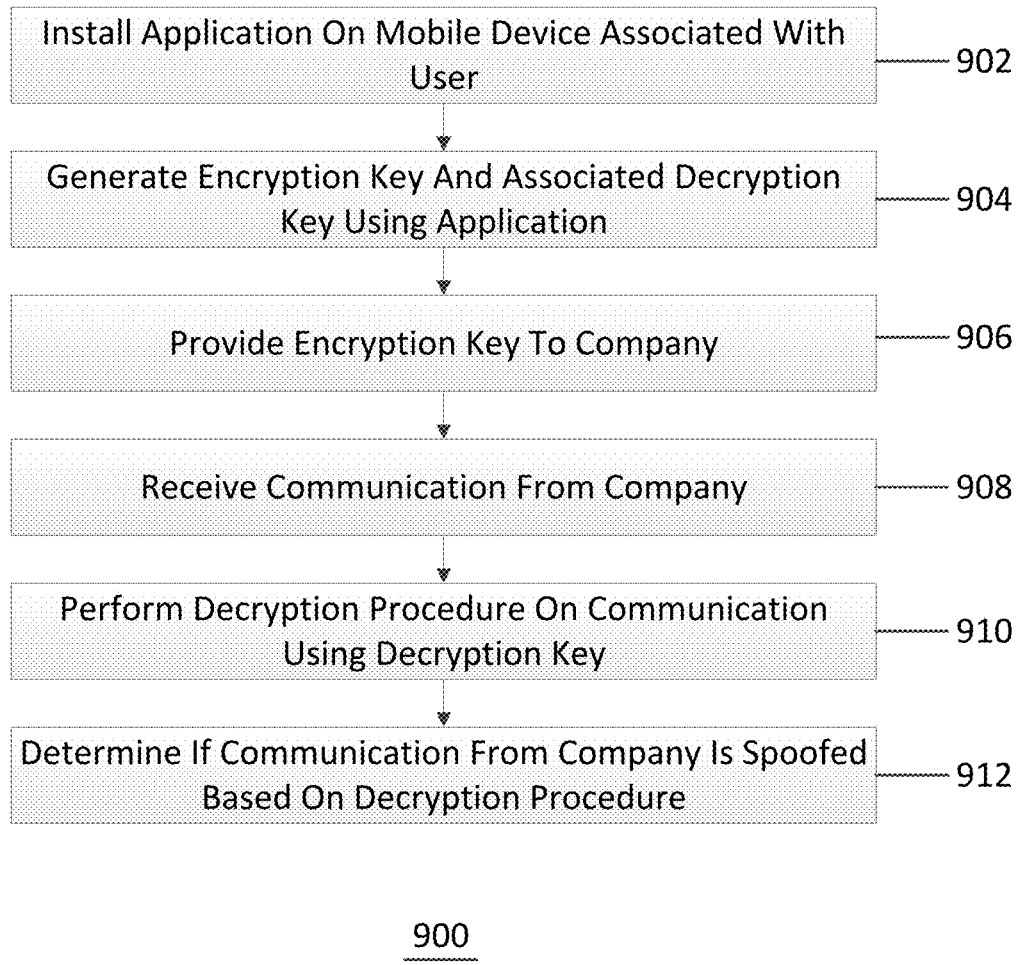
FIG. 9 is a flow diagram of a method for determining if a communication from a company is spoofed according to an exemplary embodiment of the present disclosure.

FIG. 9 is a method 900 for determining if a communication from a company is spoofed according to an exemplary embodiment of the present disclosure for determining if a communication from a company is spoofed. For example, at procedure 902, an application can be installed on a mobile device associated with a user. At procedure 904, an encryption key and an associated decryption key can be generated using the application. At procedure 906, the encryption key can be provided to the company. At procedure 908, the communication from the company can be received. At procedure 910, a decryption procedure can be performed on the communication using the decryption key. At procedure 912, the communication from the company can be determined to be spoofed based on the decryption procedure.

Figure 10:
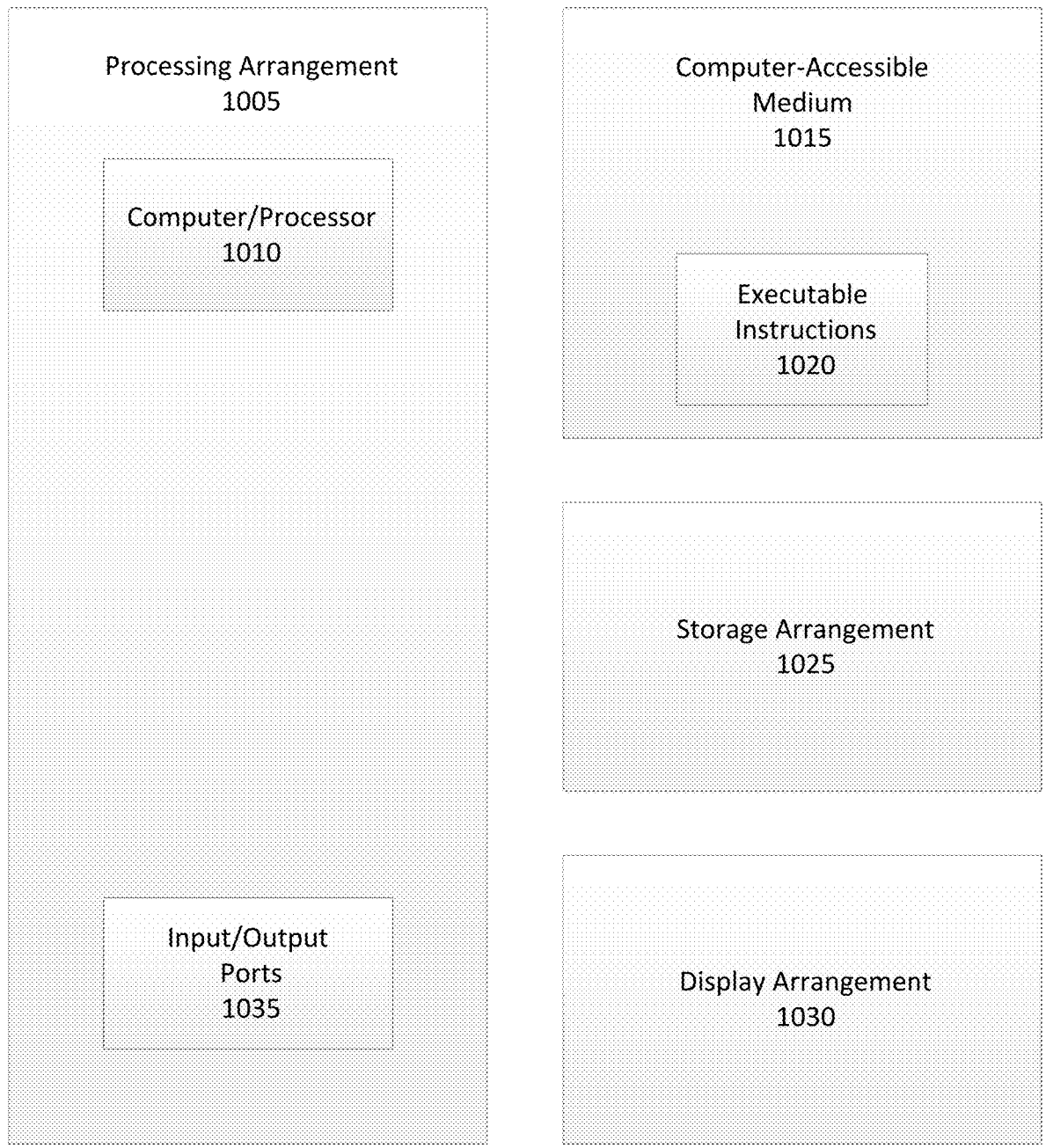
FIG. 10 is an illustration of an exemplary block diagram of an exemplary system in accordance with certain exemplary embodiments of the present disclosure.

FIG. 10 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 1005. Such processing/computing arrangement 1005 can be, for example entirely or a part of, or include, but not limited to, a computer/processor 1010 that can include, for example one or more microprocessors, and use instructions stored on a computer-accessible medium (e.g., RAM, ROM, hard drive, or other storage device).

As shown in FIG. 10, for example a computer-accessible medium 1015 (e.g., as described herein above, a transitory or non-transitory, storage device such as a hard disk, floppy disk, memory stick, CD-ROM, RAM, ROM, etc., or a collection thereof) can be provided (e.g., in communication with the processing arrangement 1005). The computer-accessible medium 1015 can contain executable instructions 1020 thereon. In addition or alternatively, a storage arrangement 1025 can be provided separately from the computer-accessible medium 1015, which can provide the instructions to the processing arrangement 1005 so as to configure the processing arrangement to execute certain exemplary procedures, processes, and methods, as described herein above, for example.

Further, the exemplary processing arrangement 1005 can be provided with or include an input/output ports 1035, which can include, for example a wired network, a wireless network, the internet, an intranet, a data collection probe, a sensor, etc. As shown in FIG. 10, the exemplary processing arrangement 1005 can be in communication with an exemplary display arrangement 1030, which, according to certain exemplary embodiments of the present disclosure, can be a touch-screen configured for inputting information to the processing arrangement in addition to outputting information from the processing arrangement, for example. Further, the exemplary display arrangement 1030 and/or a storage arrangement 1025 can be used to display and/or store data in a user-accessible format and/or user-readable format.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A non-transitory computer-accessible medium having stored thereon computer-executable instructions for determining if a communication from a company is spoofed, wherein, when a computer arrangement executes the instructions, the computer arrangement is configured to perform procedures comprising:

installing at least one application on at least one mobile device;
generating a unique identification associated with the at least one mobile device using the at least one application during the installation of the at least one application;
providing the unique identification to the company during the installation of the at least one application;
generating an encryption key and an associated decryption key using the at least one application based on attributes of at least one user of the mobile device, and attributes related to the mobile device, wherein the attributes related to the mobile device comprise a storage size of the mobile device, an amount of storage used of the mobile device, contact information of the mobile device, numbers of applications installed on the mobile device, number of messages sent of the mobile device, and accounts activated on the mobile device;
providing the encryption key to the company;
receiving the communication from a representative of the company;
accessing the at least one application stored on the at least one mobile device to generate a one-time code, wherein the at least one application includes credentials associated with at least one user stored therein and the at least one user is a customer of the company and is not the representative of the company;
providing the one-time code to the company using the at least one application;
receiving, from the representative of the company, the one-time code;
receiving, from the representative of the company, a hash value associated with the at least one application, the hash value indicative of a specific version of the at least one application;
determining, based on the hash value, whether code of the at least one application is modified;
receiving, from the representative of the company, the unique identification that was generated using the at least one application during the installation of the at least one application;
receiving, from the representative of the company, an encrypted message, the encrypted message being encrypted using the encryption key by the company; and
determining if the communication from the company is spoofed based on the receipt of the one-time code, the unique identification, and the encrypted message.

2. The computer-accessible medium of claim 1, wherein the computer arrangement is configured to receive the one-time code using the at least one application.

3. The computer-accessible medium of claim 1, wherein the computer arrangement is configured to generate the one-time code using at least one of (i) the credentials of the at least one user or (ii) hardware characteristics of the at least one mobile device.

4. The computer-accessible medium of claim 1, wherein the computer arrangement is further configured to:
access the at least one application to generate a push notification;
provide the push notification to the company using the at least one application;
receive a verification of the push notification using the at least one application; and
determine if the communication from the company is spoofed based on the verification of the push notification.

5. The computer-accessible medium of claim 1, wherein the computer arrangement is further configured to access the at least one application to:
- access a list of telephone numbers associated with the company;
- determine a particular telephone number the communication was received over;
- compare the particular telephone number to the list of telephone numbers; and
- determine if the communication from the company is spoofed based on the comparison.

6. The computer-accessible medium of claim 5, wherein the computer arrangement is further configured to determine the representative associated with the particular telephone number using the at least one application.

7. The computer-accessible medium of claim 1, wherein the computer arrangement is further configured to access the at least one application to:
- receive a further unique identification from the company;
- compare the further unique identification to the unique identification; and
- determine if the communication from the company is spoofed based on the comparison.

8. The computer-accessible medium of claim 1, wherein the computer arrangement is configured to access the at least one application to:
- perform a decryption procedure on the encrypted message using the decryption key; and
- determine if the communication from the company is spoofed based on the decryption procedure.

9. The computer-accessible medium of claim 1, wherein the unique identification includes at least one of (i) an International Mobile Equipment Identity number, (ii) a mobile equipment identifier number, (iii) an electronic serial number, or (iv) an international mobile subscriber identity number.

10. A non-transitory computer-accessible medium having stored thereon computer-executable instructions for verifying that a communication between a company and a user is not spoofed, wherein, when a computer arrangement executes the instructions, the computer arrangement is configured to perform procedures comprising:
- initiating the communication between a representative of the company and the user;
- receiving a verification request from an application stored on a mobile device associated with the user, wherein the verification request includes a one-time code, and wherein the application includes credentials associated with the user stored therein and the user is a customer of the company and is not the representative of the company;
- receiving the one-time code using a further application;
- verifying the one-time code using the further application;
- receiving a hash value associated with the application, the hash value indicative of a specific version of the application;
- determining, based on the hash value, whether code of the application is modified;
- receiving, from the application stored on the mobile device, a unique identification associated with the mobile device, wherein the unique identification was generated using the application during installation of the application on the mobile device, and was provided to the company during the installation of the application,
- receiving an encryption key from the application stored on the mobile device, the encryption key and an associated decryption key being generated using the application based on attributes of the user, and attributes related to the mobile device, wherein the attributes related to the mobile device comprise a storage size of the mobile device, an amount of storage used of the mobile device, contact information of the mobile device, numbers of applications installed on the mobile device, number of messages sent of the mobile device, and accounts activated on the mobile device; and
- verifying that the communication between the company and the user is not spoofed based on the verification of the one-time code, and the unique identification.

11. The computer-accessible medium of claim 10, wherein the one-time code is generated by the application stored on the mobile device.

12. The computer-accessible medium of claim 10, wherein:
- the verification request further includes a push notification; and
- verifying that the communication between the company and the user is not spoofed based on the push notification.

13. The computer-accessible medium of claim 10, wherein the computer arrangement is further configured to:
- receive a unique identifier associated with the mobile device of the user; and
- provide the unique identifier to the application installed on the mobile device when initiating the communication.

14. The computer-accessible medium of claim 10, wherein the verification request includes a request for at least one message, and wherein the computer arrangement is further configured to:
- encrypt the at least one message using the encryption key; and
- verify that the communication is not spoofed by providing the at least one encrypted message to the user.

15. The computer-accessible medium of claim 14, wherein the at least one message includes a unique identifier associated with the mobile device of the user.

16. The computer-accessible medium of claim 15, wherein the unique identifier includes at least one of (i) an International Mobile Equipment Identity number, (ii) a mobile equipment identifier number, (iii) an electronic serial number, or (iv) an international mobile subscriber identity number.

17. The computer-accessible medium of claim 10, wherein the computer arrangement is further configured to send a digital voiceprint associated with an employee of the company to the mobile device associated with the user.

18. A non-transitory computer-accessible medium having stored thereon computer-executable instructions for determining if a communication from a company is spoofed, wherein, when a computer arrangement executes the instructions, the computer arrangement is configured to perform procedures comprising:
- installing at least one application on a mobile device associated with at least one user;
- generating a unique identification associated with the mobile device using the at least one application during the installation of the at least one application;
- providing the unique identification to the company during the installation of the at least one application;
- generating an encryption key and an associated decryption key using the at least one application based on attributes of the at least one user, and attributes related to the mobile device, wherein the attributes related to the mobile device comprise a storage size of the mobile device, an amount of storage used of the mobile device, contact information of the mobile device, numbers of applications installed on the mobile device, number of messages sent of the mobile device, and accounts activated on the mobile device;

providing the encryption key to the company;

receiving, from a representative of the company, the communication, wherein the at least one user is a customer of the company and is not the representative of the company;

performing a decryption procedure on the communication using the decryption key;

receiving, from the representative of the company, a hash value associated with the at least one application, the hash value indicative of a specific version of the at least one application;

determining, based on the hash value, whether code of the at least one application is modified;

receiving, from the representative of the company, the unique identification that was generated using the at least one application during the installation of the at least one application; and determining if the communication from the company is spoofed based on the decryption procedure, and the unique identification.

* * * * *